United States Patent
Wuerfel et al.

(10) Patent No.: US 6,873,900 B2
(45) Date of Patent: Mar. 29, 2005

(54) METHOD FOR OPERATING AN INTERNAL COMBUSTION ENGINE AND ARRANGEMENT THEREFOR

(75) Inventors: Gernot Wuerfel, Vaihingen/Enz (DE); Rainer Ortmann, Bangalore (IN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/261,592

(22) Filed: Oct. 2, 2002

(65) Prior Publication Data

US 2003/0065437 A1 Apr. 3, 2003

(30) Foreign Application Priority Data

Oct. 2, 2001 (DE) .......................................... 101 48 649

(51) Int. Cl.[7] .............................. G05D 1/00; B60T 7/12
(52) U.S. Cl. .................. 701/103; 123/179.17; 123/480; 123/339.29; 123/406.47
(58) Field of Search ...................... 701/103; 123/179.17, 123/205, 338, 406.47, 339.29, 445, 408, 275, 278, 364, 357, 480

(56) References Cited

U.S. PATENT DOCUMENTS

| | | | | |
|---|---|---|---|---|
| 4,421,071 A | * | 12/1983 | Paul | ........................... 123/1 A |
| 4,765,299 A | * | 8/1988 | Wataya et al. | ......... 123/339.15 |
| 5,738,063 A | * | 4/1998 | Pfuhl et al. | ............. 123/198 D |
| 6,230,558 B1 | * | 5/2001 | Miwa et al. | .................. 73/201 |

FOREIGN PATENT DOCUMENTS

| | | |
|---|---|---|
| DE | 196 25 487 | 1/1998 |
| DE | 199 45 673 | 4/2001 |

OTHER PUBLICATIONS

"Taschenbuch der Meßtechnik mit Schwerpunkt Sensortechnik" by Hans–Rolf Tränkler, 1990, R. Oldenbourg Verlag GmbH, München, pp. 209 to 222.

* cited by examiner

*Primary Examiner*—Willis R. Wolfe
*Assistant Examiner*—Johnny H. Hoang
(74) *Attorney, Agent, or Firm*—Walter Ottesen

(57) ABSTRACT

A fuel pump (14) pumps fuel in a method for operating an internal combustion engine (10). The fuel pump (14) is connected at its input end to a fuel tank (12). Fuel reaches at least one combustion chamber (22) of the engine (10) via at least one fuel-injection device (16). In order to be able to inject fuel with still greater accuracy into the combustion chamber (22) of the engine (10), the fuel quantity which arrives in the combustion chamber (22) is determined from the signal of a through-flow measuring device (18).

18 Claims, 8 Drawing Sheets

METHOD FOR OPERATING AN INTERNAL COMBUSTION ENGINE AND ARRANGEMENT THEREFOR

FIELD OF THE INVENTION

The invention relates to a method for operating an internal combustion engine wherein the fuel is pumped by a fuel pump, which is connected at the input end to a fuel tank. In the method, the fuel reaches at least one combustion chamber of the engine via at least one fuel injection device. The invention also relates to a computer program and a control apparatus for operating the engine as well as the engine itself.

BACKGROUND OF THE INVENTION

Such a method is known in the marketplace and is utilized in an internal combustion engine which is built into a motor vehicle. An electric fuel pump pumps fuel from a tank to an injection valve. The injection valve injects the fuel into an intake manifold of the engine. Supply lines branch from the intake manifold to the individual cylinders or corresponding combustion chambers of the engine. The combustion chambers can be connected to the supply lines via injection valves. Depending upon which injection valve is just then open, the fuel reaches one or the other combustion chamber.

A method of the above-mentioned type is known also from such internal combustion engines wherein the fuel is injected directly into the combustion chamber of the engine. The engine can here be a gasoline engine or a diesel engine. In this case, each combustion chamber has its own fuel injection device.

In the known method, the injection time of the fuel injection device is pregiven by a characteristic line. A quantity of fuel to be injected is supplied to this characteristic line and this fuel quantity, in turn, is dependent upon the operating state of the engine and on the power wanted from the engine.

Basically, it is possible that the intended fuel quantity is not delivered notwithstanding the correct duration of opening of the fuel injection device. The reason for this can, for example, be plugged injection holes in the fuel injection device. Manufacturing tolerances can also lead to the situation that the fuel quantities supplied by different fuel injection devices are different for the same opening duration. In the known method, quasi steady state changes can be noticed from a change of the fuel consumption caused by the lambda control or by a change of the load and/or power. In many cases, it would, however, be desirable to be able to determine deviations of the actually injected fuel quantity from the desired fuel quantity with a still higher resolution.

SUMMARY OF THE INVENTION

In view of the above, it is an object of the invention to improve a method of the kind referred to initially herein so that deviations of the fuel quantity, which is outputted by the fuel injection device into a combustion chamber, can be determined as accurately as possible.

The method of the invention is for operating an internal combustion engine having a combustion chamber wherein fuel is pumped by a fuel pump having an input connected to a fuel tank. The method includes the steps of: providing a through-flow measuring device for generating a signal; providing a fuel-injection device for injecting fuel into the combustion chamber; and, determining the fuel quantity (m) which arrives in the combustion chamber from the signal.

The method of the invention affords the advantage that the fuel quantity, which reaches the combustion chamber from the fuel injection device, is directly present insofar as it must not be computed from other variables. These variables can, for example, be the injection pressure and the injection time. The injection time is, however, no measured quantity but a pregiven quantity. Whether the actual injection time really corresponds to the desired value is not always known.

Up to now, in spark-injection engines, the actual injected fuel quantity was computed from the lambda ratio and the inducted air mass flow. Both quantities are detected by sensors but at locations which are far remote from the combustion chamber of the engine. The inducted air mass flow is, for example, measured at the inlet of the intake manifold and the lambda ratio is measured in the region of the catalytic converter in the exhaust-gas pipe. Various time constants are dependent upon the running time of the air mass flow from the sensor to the combustion chamber and on the running time of the exhaust-gas flow from the combustion chamber to the lambda probe. For this reason, the through-flow quantity cannot be determined in accordance with work cycles in the known method.

In contrast to the above, the actually outputted fuel quantity can be determined directly from the signal of the through-flow measuring element, which is utilized in the method of the invention. Inaccuracies are precluded in the method of the invention which occur because of the computation and because of the consideration of imprecise constants. It is understood that it is advantageous when the through flow element is mounted as close as possible to the combustion chamber of the engine or the fuel injection device.

According to a first embodiment, the through-flow measuring device detects the velocity with which the fuel flows through a specific cross section and the fuel quantity is determined therefrom. Such through-flow measuring devices operate very precisely. With these devices, even the smallest changes of the flow velocity are detected.

Depending upon the type of through-flow measuring device, a mean velocity in the flow cross section or a local velocity is detected. The flow profile is known over the cross section of the fuel lines. For this reason, an average velocity can be determined also from a local velocity, from which, in turn, the mass flow of the fuel is determined while considering the flow cross section and the pressure-dependent density of the fuel.

In an internal combustion engine having several combustion chambers, it is suggested that the fuel quantity is determined for each combustion chamber of the engine from the signal of a through-flow measuring device assigned to the corresponding combustion chamber. In order to carry out this method, so many through-flow measuring devices are needed as the engine has cylinders. The advantage herein lies in the fact that the fuel quantity, which reaches the combustion chambers of the individual cylinders, is determined in a direct manner and therefore with great precision.

In an internal combustion engine having more combustion chambers than through-flow measuring devices, it is possible as an alternative to the above, that the determined fuel quantity is assigned to a specific combustion chamber via the opening time point of the at least one fuel injection device and, if required, via the angular position of a crankshaft of the engine. Such an engine is built relatively economically because only a single through-flow measuring device is required in the extreme case.

The actual value of the fuel quantity, which reaches a specific combustion chamber, is determined from the signal of the through-flow measuring device. It is also especially advantageous when this actual value is controlled in accordance with a desired value. In this way, exactly that fuel quantity reaches each combustion chamber which is optimal for the particular operating state of the engine.

Here, it is also possible that a mean value is formed from the determined fuel quantities, which reach the combustion chambers of an engine, over at least one revolution of the crankshaft via sliding mean value formation and the standard deviations of the respective determined fuel quantities, which reach the individual combustion chambers, from the mean value are formed and the opening times of the individual fuel injection devices are so changed that these standard deviations are minimal.

In accordance with this embodiment of the method of the invention, various manufacturing tolerances of fuel injection devices can be compensated in a simple manner. This helps the smooth running of the engine and the emission performance of the engine is improved thereby.

A basic advantage of all those improvements wherein the individual quantities are determined which reach the individual combustion chambers is that fuel injection devices an be used which optimally atomize the fuel for the combustion but have high scattering of the injected fuel quantity because of the manufacturing tolerances. An example for this is tapered-spray valves which open outwardly. In these valves, the actual throttle effect occurs directly at the seat of the valve needle. In this way, the complete system pressure acts directly on the valve seat, which is optimal for the atomization of the fuel.

In this way, a good penetration of the injected fuel into the combustion chamber is achieved with favorable exhaust-gas characteristics and consumption characteristics. In such a tapered-spray valve, a very large quantity of fuel, however, reaches the combustion chamber for a relatively short stroke of the valve needle. Accordingly, manufacturing tolerances have a relatively large influence on the injected fuel quantity in such a tapered-spray valve. With the method of the invention, such scattering can be detected, monitored, and/or compensated.

Here, it is especially advantageous when the mean value is controlled in accordance with a desired value. In his way, a precise power adjustment and emission adjustment are possible. That embodiment of the method of the invention is also advantageous wherein, for the determination of the fuel quantity reaching a combustion chamber, the time is considered which the fuel needs from the through-flow measuring device to the combustion chamber. In this way, the accuracy in the determination of the fuel quantity, which reaches the combustion chamber to the engine, is improved once again.

According to the invention, it is also suggested that the ratio of the determined fuel, which is injected into a combustion chamber, to the fuel, which is combusted in the combustion chamber, is determined by means of a signal of a lambda probe. A balance of this kind of the fuel conversion makes possible an estimate as to whether deposits will occur in the combustion chamber. In internal combustion engines having direct injection, it can in this way also be determined whether the spray formation is no longer optimal because of dirtying or coking of the openings of the fuel injection device, which could lead to a deteriorated combustion of the injected fuel. Accordingly, timely maintenance measures can be initiated with the method according to the invention.

The invention also relates to a computer program which is suitable for carrying out the above method, when executed on a computer. Here, it is especially advantageous when the computer program is stored on a memory, especially on a flash memory or on a ferrite RAM.

The invention further relates to a control apparatus (open loop and/or closed loop) for operating an internal combustion engine. It is suggested that the control apparatus include a memory on which a computer program of the above kind can be stored.

Furthermore, the invention relates to an inter al combustion engine having the following: a fuel system, a fuel tank and a fuel pump, which is connected at its inlet end to the fuel vessel, and at least one fuel injection device via which fuel reaches at least one combustion chamber of the engine.

In order to be able to operate such an engine optimally with respect to consumption and exhaust gas and to timely carry out maintenance measures, it is suggested that the engine include at least one through-flow measuring device in a fuel line, which supplies a signal from which the fuel quantity, which reaches the combustion chamber of the engine, can be determined.

In a further embodiment, it is suggested for this purpose that the through-flow measuring device includes the following: a hot-wire anemometer, a sensor having a bending section which is deflected by the fuel flow and whose deflection is detected by a resistance strain gauge; a measuring piston which is subjected to a fuel flow and whose displacement is inductively detected; a venturi construction or a toothed wheel anemometer. All the through-flow measuring devices function very accurately and take up little space so that they can be easily integrated into the engine.

It is also suggested that each fuel injection device be assigned its own through-flow measuring device and especially that a through-flow measuring device be integrated into each fuel injection device. In such an engine, the fuel quantity of a cylinder of the engine, which reaches the combustion chamber, can be determined with especially high accuracy. The integration of the through-flow measuring device into a fuel injection device facilitates the assembly.

It is, however, also possible that a through-flow measuring device can be mounted in a common inflow of the fuel injection device. This affords the advantage that the through-flow measuring device can be mounted at a location which is relatively well accessible, which facilitates assembly. In an internal combustion engine having gasoline-direct injection, the fuel flow measuring device can be mounted, for example, between the high-pressure pump and the fuel rail.

A condition precedent is, however, that there are no leakage lines and/or overflow lines leading back from the fuel injection devices and from the fuel rail. If such feedback lines are present, then the through-flow measuring device can be mounted also ahead of the high-pressure pump upstream of the entry of the leakage lines and/or overflow lines. In internal combustion engines having intake manifold injection, the through-flow measuring devices can be mounted between the fuel pump and the fuel injection device.

It is especially preferable that the internal combustion engine include a control apparatus (open loop and/or closed loop) of the above type.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
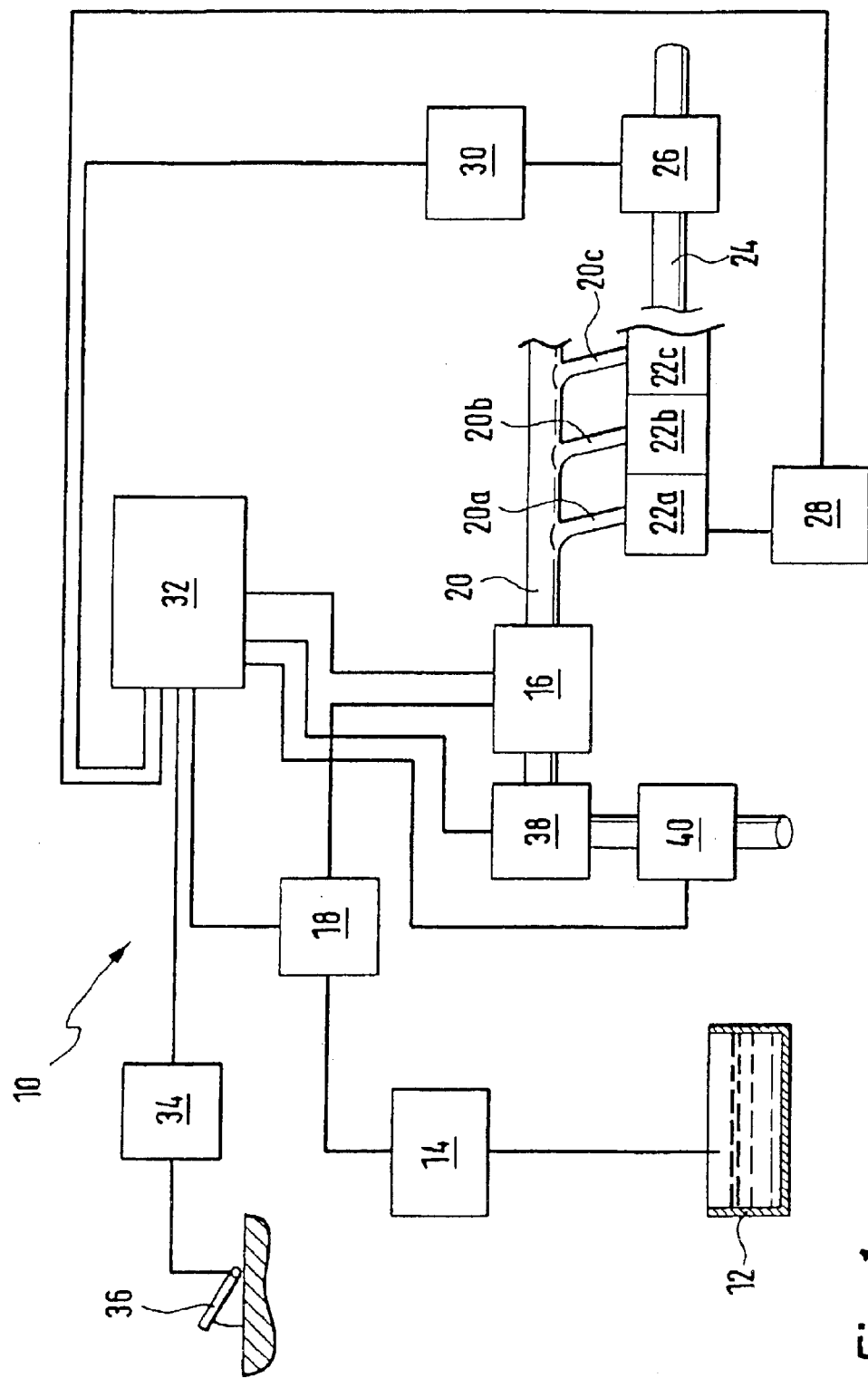
FIG. 1 is a schematic of a first embodiment of an internal combustion engine having intake manifold injection.

In FIG. 1, an internal combustion engine is identified by reference numeral 10. The engine includes a fuel tank 12 from which an electric fuel pump 14 pumps fuel to a fuel injection device 16. A through-flow measuring device 18 is mounted in the flow path between the fuel pump 14 and the fuel injection device 16.

The fuel injection device 16 is mounted in or on an intake manifold 20. Sections 20a, 20b and 20c branch from the intake manifold 20 to respective combustion chambers 22a, 22b and 22c. The engine 10 has additional combustion chambers which are, however, not shown. The connection of the combustion chambers 22 to the intake manifold sections 20 is established via inlet valves which are not shown in FIG. 1. The combustion exhaust gases are introduced into the exhaust-gas pipe 24 from the combustion chambers 22 via outlet valves (not shown). A catalytic converter 26 is mounted in the exhaust-gas pipe 24.

The angular position of a crankshaft (not shown) of the engine 10 is detected by an angle sensor 28. The angle sensor is a toothed wheel wherein a number of teeth are missing at a specific location. The rpm of the crankshaft of the engine is also determined with this toothed wheel. The mixture of fuel and air, which was combusted in the combustion chambers 22, is measured in the catalytic converter 26 by a lambda probe 30. The angle sensor 28 and the lambda probe 30 are likewise connected to a control apparatus 32 as is the through-flow measuring device 18.

A position transducer 34 picks up the position of an accelerator pedal 36 and supplies signals to the control apparatus 32. At its output end, the control apparatus 32 is connected to the fuel injection device 16. A throttle flap 38 and a hot-film sensor 40 (HFM sensor) are mounted in the intake manifold 20 upstream of the fuel injection device 16. The hot-film sensor 40 detects the air mass flowing through the intake manifold. The throttle flap 38 and the HFM sensor 40 are likewise connected to the control apparatus 32.

The operation of the internal combustion engine 10 will now be described.

The control apparatus 32 controls the throttle flap 38 into a specific position in dependence upon the position of the accelerator pedal 36 and the rpm of the crankshaft of the engine 10 which is determined by the angle sensor 28. The position of the accelerator pedal 36 is supplied to the control apparatus 32 by the position transducer 34. At the same time, a desired value, which corresponds to the instantaneous a operating point, is determined in the control apparatus 32 for the fuel quantity to be injected by the fuel-inject on device 16. This desired value adjusts in accordance to the air mass determined by the HFM sensor.

The fuel quantity, which actually arrives at the fuel injection device 16 from the electric fuel pump 14, is determined from the signal of the through-flow measuring device 18 and is controlled in accordance with the desired value in the sense of a closed control loop. The injected fuel quantity can be adjusted very exactly via this closed control loop. If required, a readjustment via a desired-value adaptation can take place via the lambda probe 30. The time point at which the fuel quantity is outputted by the fuel injection device 16 adjusts in accordance to the work stroke in the corresponding combustion chamber 22. This point is determined via the sensor 28 from the angular position of the crankshaft.

With the signal of the lambda probe 30 and the HFM sensor 40, a computation can be made as to how much fuel was actually combusted in the combustion chambers 22 of the engine 10. If this results in a difference to the injected fuel quantity, which is determined from the through-flow measuring device 18, then it can be assumed that a specific component of the injected fuel is not combusted. If this is determined over a longer time span, then it can be assumed that the fuel, which is not combusted, leads to deposits in the combustion chambers 22. A difference determined in this way is an indication that maintenance should be carried out on the engine 10 in order to determine the cause of the difference.

The instantaneous operating points of the individual combustion chambers 22 can be detected via the angular position of the crankshaft of the engine 10 which is detected by the angle sensor 28. The signals transmitted by the lambda probe 30, on the one hand, and transmitted by the through-flow measuring device 18, on the other hand, can, in this way, be assigned to individual combustion chambers 22a, 22b or 22c. The comparison of the combusted fuel quantity, which is determined via the lambda probe 30, to the injected fuel quantity, which is determined by the through-flow measuring device 18, can take place selectively with respect to the cylinders, which facilitates and makes more accurate the locating of possible problem locations in the engine 10.

Figure 2:
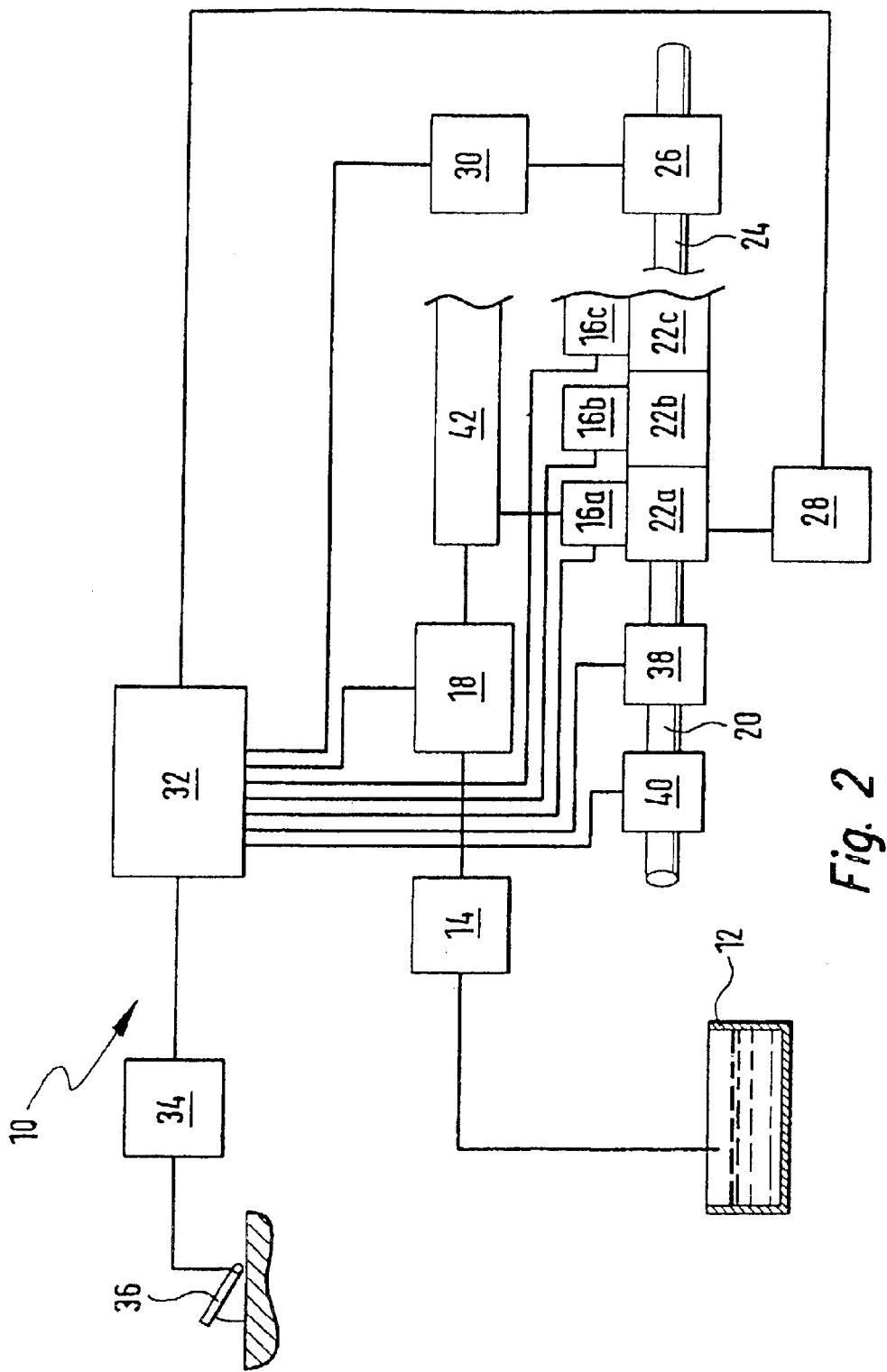
FIG. 2 is a view similar to FIG. 1 of a second embodiment of an internal combustion engine having gasoline-direct injection.

FIG. 2 shows a second embodiment of an internal combustion engine 10. In this embodiment, and in the subsequent embodiments, such elements and regions which have functions equivalent to the elements and regions of FIG. 1 are provided with the same reference numerals.

The engine 10 shown in FIG. 2 is not an engine with intake manifold injection; instead, the engine 10 is a gasoline-direct injection engine. In this engine, several fuel injection devices (16a, 16b, 16c) are mounted directly at the corresponding combustion chambers (22a, 22b, 22c), respectively. The fuel injection devices 16 are connected to a fuel rail 42, whereinto the fuel is pumped by a high-pressure pump 14 having an integrated presupply pump (not shown). The fuel is stored under high pressure in the fuel rail 42. The through-flow measuring device 18 is mounted between the high-pressure pump 14 and the fuel rail 42.

The engine 10 shown in FIG. 2 can operate in different operating modes. In stratified operation, the fuel is so injected by the fuel injection devices 16 so that it is present layered in the combustion chambers 22. This means that an ignitable mixture is present only in the region of a spark plug of the combustion chamber 22 (the spark plug is not shown); whereas, only a very lean mixture or no fuel at all is present in the remainder of the combustion chamber 22. The engine 10 is dethrottled in stratified operation, that is, the throttle flap 38 is completely open. In contrast, in homogeneous operation, the fuel is so injected that it is homogeneously distributed in the combustion chambers 22. In this mode of operation, the throttle flap 38 is adjusted in correspondence to the instantaneous load.

In the engine 10 shown in FIG. 2, exactly so much fuel is pumped to the fuel rail 42 by the high-pressure pump 14 as arrives in the combustion chambers 22 via the fuel-injection devices 16. The fuel quantity, which is determined by the through-flow measuring device 18 thereby corresponds exactly to that quantity which is injected by the fuel injection devices 16 into the combustion chambers 22. In this embodiment too, the injection time point of the fuel injection device 16 of a specific combustion chamber 22 is dependent upon the angular position of the crankshaft. For this reason, the fuel quantity, which is determined by the through-flow measuring device 18, can be assigned to the corresponding combustion chambers 22 with the aid of the signal transmitted from the angle sensor 28. Even though only one single through-flow measuring device 18 is present in the engine 10, the individual fuel quantities, which reach individual combustion chambers 22, can be determined in this manner.

In the engine 10 shown in FIG. 2, a mean value is formed from the determined fuel quantities which overall arrive in the combustion chambers 22. This takes place via a so-called sliding mean value formation. In this mean value formation, a pregiven number of the most recent values of the determined overall fuel quantities are used to determine the mean value. The standard deviations from the formed mean values are then computed from the individual fuel quantities assigned to the individual combustion chambers 22.

The opening times of the individual fuel injection devices 16 are so changed by the control apparatus 32 that these determined or computed standard deviations become minimal. The mean value is controlled in accordance with a desired value. This desired value results, inter alia, from the torque wanted by the user of the engine 10. This, in turn, corresponds to the position of the accelerator pedal 36 tapped by the position transducer 34. Other factors can also influence the desired value such as a temperature of the engine 10, et cetera.

With the described method, it is achieved that notwithstanding system-caused manufacturing tolerances of the fuel-injection devices 16, the same fuel quantity arrives in all the combustion chambers 22 of the engine. This essentially has two advantages: on the one hand, the smooth running of the engine 10 is improved and, on the other hand, fuel injection devices with relatively large manufacturing tolerances can be used.

Figure 3:
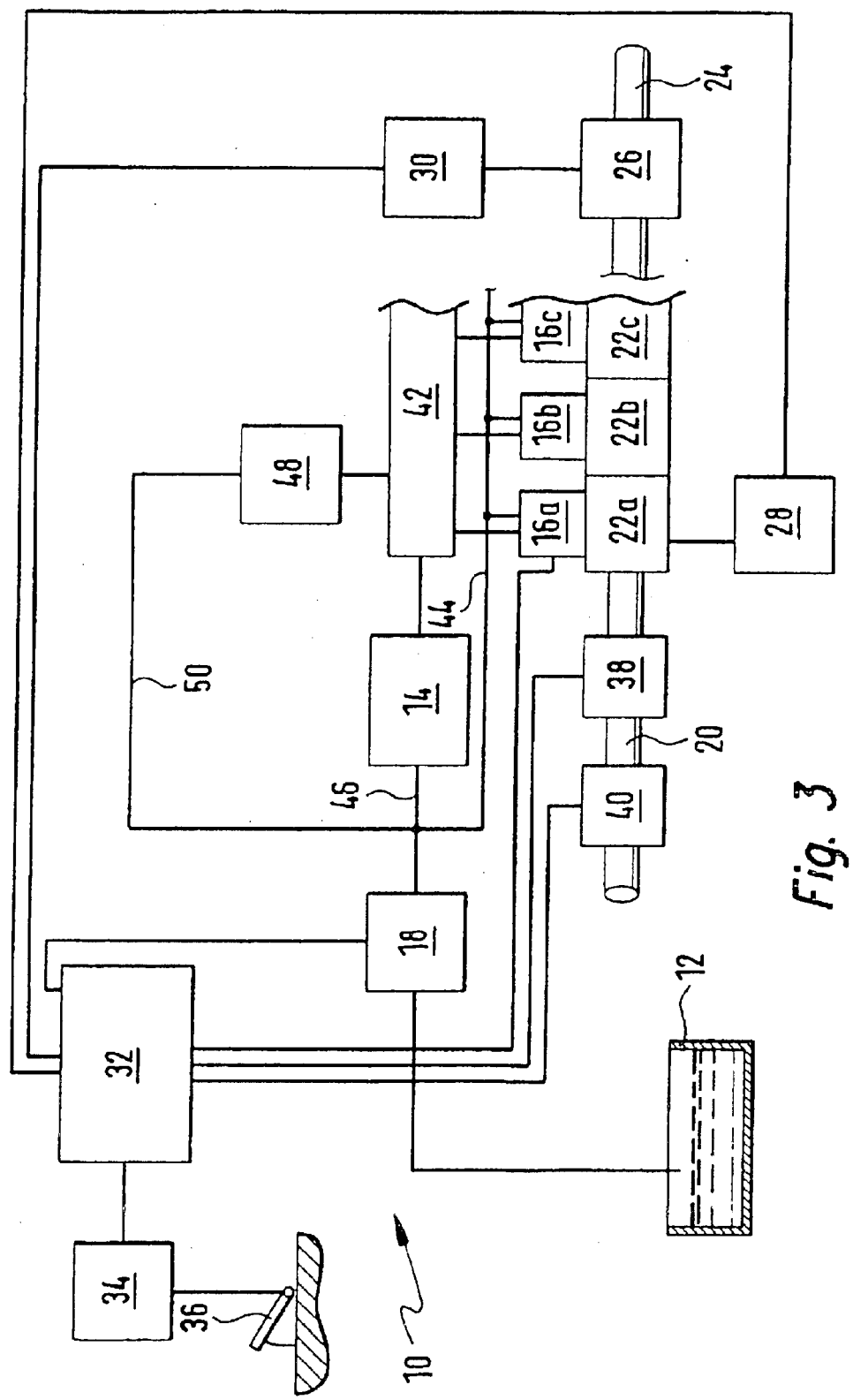
FIG. 3 is a view similar to FIG. 1 of a third embodiment of an internal combustion engine having gasoline-direct injection.

The engine 10 shown in FIG. 3 also operates with gasoline-direct injection. The fuel injection devices 16 used in this engine are, however, connected via a return flow line 44 to a low-pressure fuel line 46 disposed upstream of the high-pressure pump 14. For reasons of illustration, the drive lines of the fuel injection devices 16b and 1c from the control apparatus 32 are not shown in FIG. 3.

The fuel rail is also connected to the low-pressure fuel line 46 via a pressure limiting valve 48 and a return flow line 50. So that the fuel quantity, which is determined via the through-flow measuring device 18, is not made incorrect by the fuel flowing through the return fuel lines 44 and 50, the through-flow measuring device 18, in this case, must be mounted upstream of the entry of the return flow lines 44 and 50 into the low-pressure fuel line 46.

Figure 4:
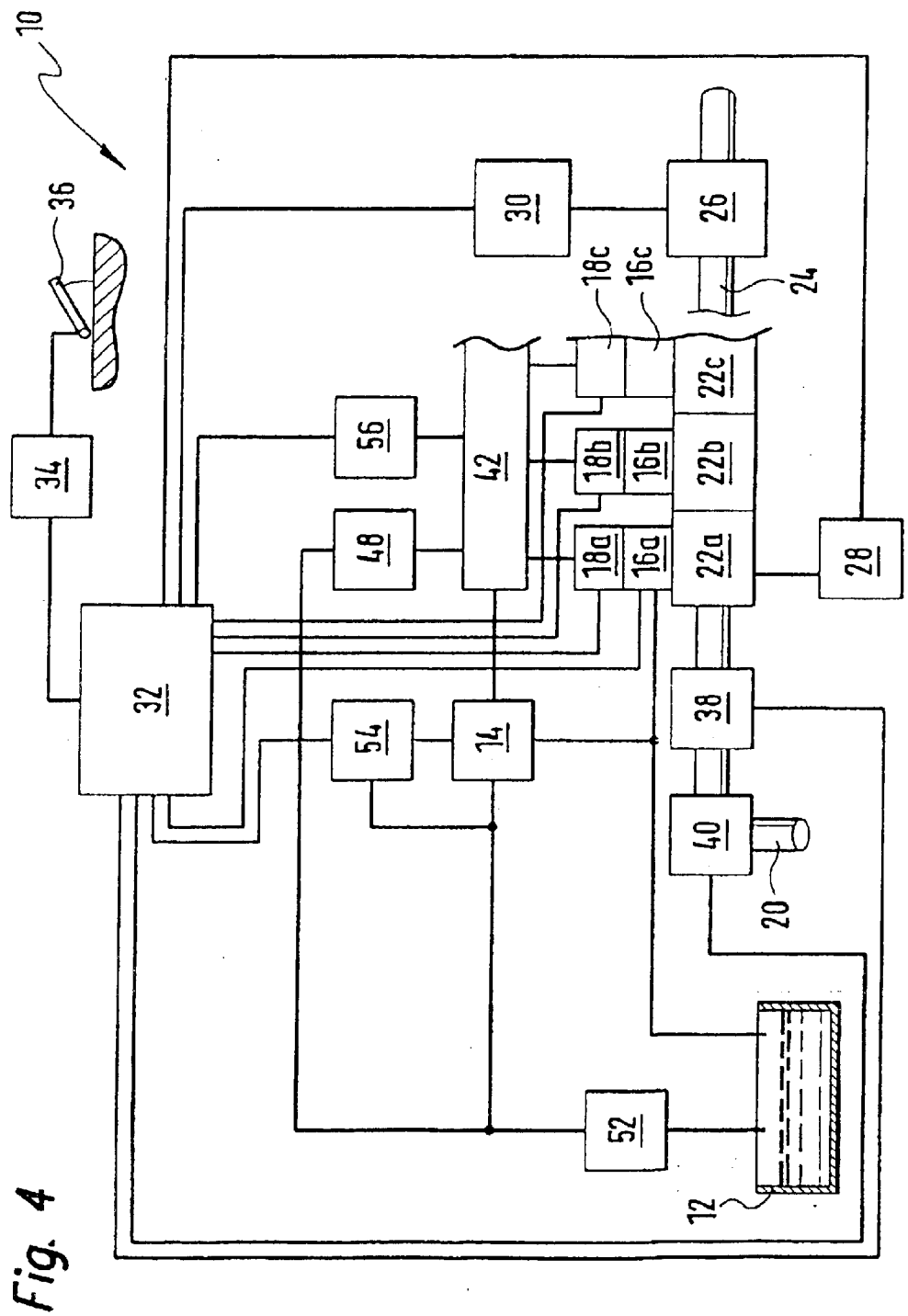
FIG. 4 is an embodiment similar to FIG. 1 of a fourth embodiment of an engine having gasoline-direct injection.

In FIG. 4, another embodiment of an engine 10 is shown. This engine too operates with gasoline-direct injection. In contrast to the previous embodiment, each fuel injection device (16a, 16b, 16c) has its own through-flow measuring device (18a, 18b, 18c). Furthermore, the presupply pump is not integrated into the higher pressure pump 14; instead, the presupply pump is configured as a separate electrical fuel pump 52. The pumped quantity of the high-pressure pump 14 is, in turn, adjusted via a quantity control valve 54 in the engine 10 shown in FIG. 4. The quantity control valve 54 is driven by the control apparatus 32 in dependence upon the signals of a pressure sensor 56 which detects the pressure in the fuel rail 42.

Figure 5:
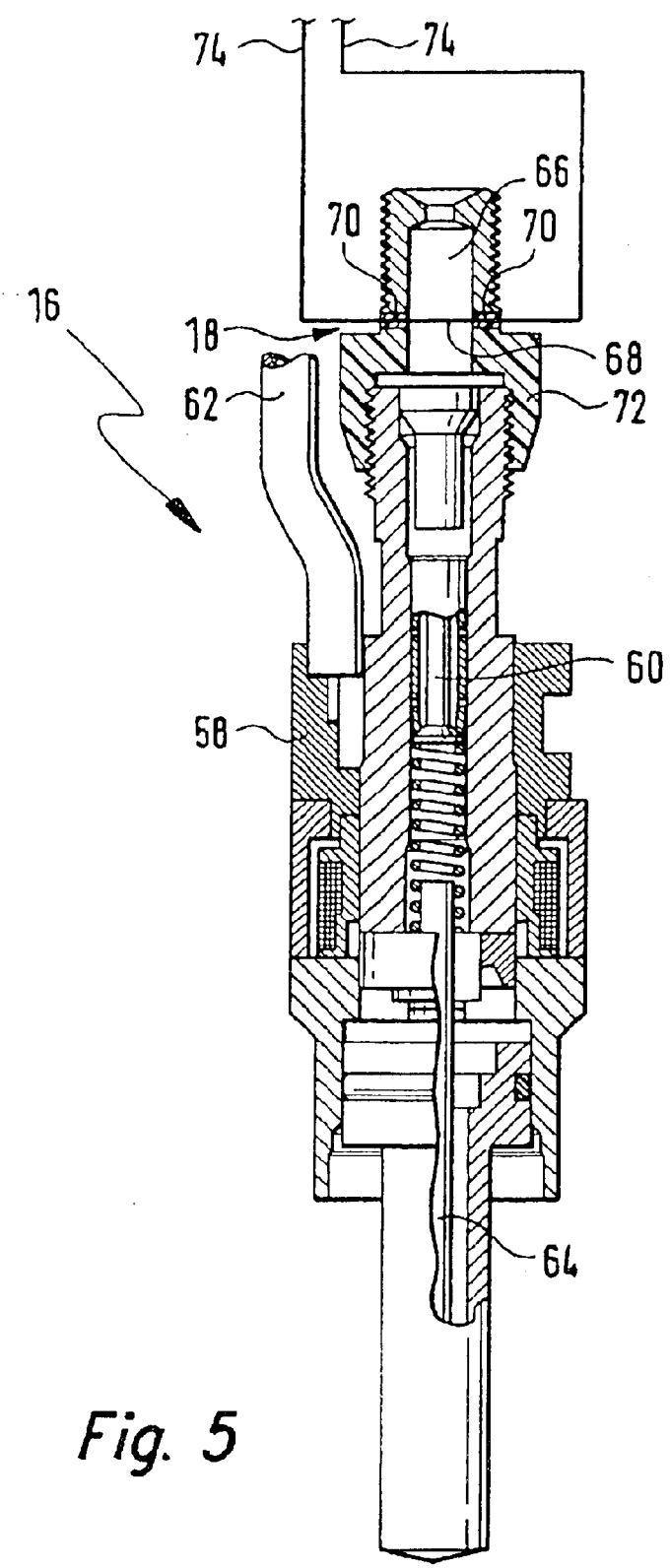
FIG. 5 is a side elevation view, partially in section, of a first embodiment of a fuel injection device having an integrated through-flow measuring device.

In FIG. 5, one of the fuel injection devices 16 of the engine 10 shown in FIG. 4 is shown in detail. The fuel injection device 16 is an injector having a valve housing 58 and a magnet actuator 60, which is driven via a cable connection 62 by the control apparatus 32. The magnet actuator 60 operates on a valve needle 64 which opens outwardly and clears an outlet opening present at the lower end of the injector in FIG. 5 (basically, a valve needle opening inwardly is also conceivable).

At the upper end of the injector 16 in FIG. 5, a high pressure connection 66 is present, in which a hot-wire anemometer 68 is integrated. The hot-wire anemometer is mounted via insulators 70 in an adapter part 72 of the injector 16, which is made of plastic. Connecting lines 74 for the hot-wire anemometer 68 lead to the control apparatus 32.

Figure 6:
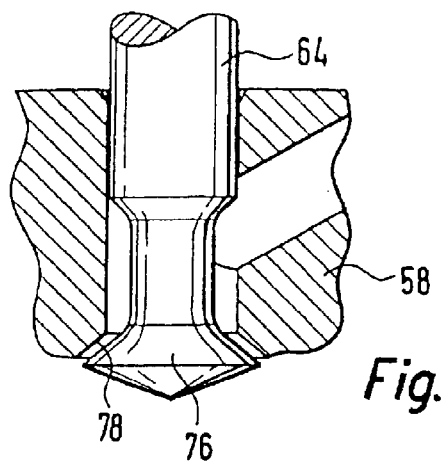
FIG. 6 is a detail view, partially in section, of the region of the fuel injection device of FIG. 5.

As shown in FIG. 6, the injector shown in FIG. 5 is a tapered-spray valve opening outwardly. The valve element of the tapered-spray valve is configured as a cone 76 having a correspondingly conical valve seat 78. The flow is directly throttled at the valve seat 78 when the valve cone 76 is lifted from the valve seat 78. The full system pressure is thereby directly present at the valve seat 78, which leads to an optimal atomization of the fuel. However, even a relatively short stroke of the valve needle ensures the discharge of a relatively large quantity of fuel. A scattering of the manufacturing accuracy, which cannot be avoided in series manufacture, thereby leads to a relatively large scattering of the discharged fuel quantity from one injector 16 to the other for the same stroke of the valve needle 64. This is compensated by the above-described method.

Figure 7:
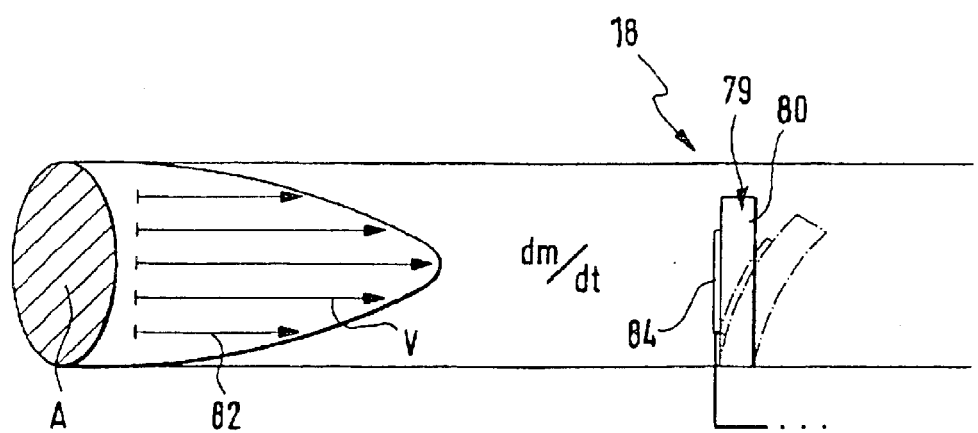
FIG. 7 is a schematic of a second embodiment of a through-flow measuring device.

In lieu of the hot-wire anemometer shown in FIG. 5, also other measuring devices can be used as through-flow measuring devices 18. In FIG. 7, a micromechanical sensor 79 is shown, which includes a bending section 80, which is deflected (shown in phantom outline) by the fuel flow (arrows 82). The deflection is detected by a resistance strain gauge 84. The deflection of the bending section 80 is more or less intense depending upon the flow velocity V.

The flow cross section A and the density of the fuel are known (the density, can, if required, be determined from the signal of a pressure sensor and a temperature sensor). For this reason, the mass flow dm/dt can be computed from the velocity V determined by the deflection of the bending section 80. For a known opening duration of the injector 16, the injected fuel quantity m can, in turn, be computed from the mass flow dm/dt.

Figure 8:
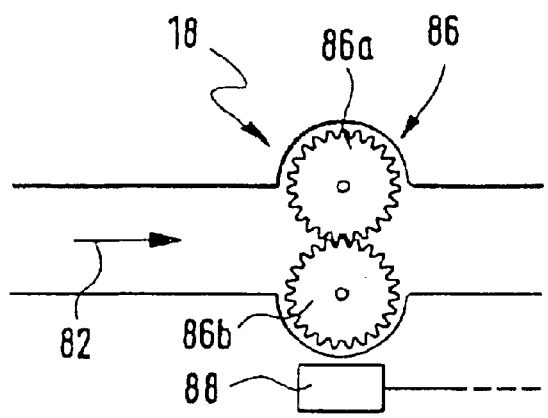
FIG. 8 is a schematic similar to FIG. 7 of a third embodiment of a through-flow measuring device.
Figure 9:
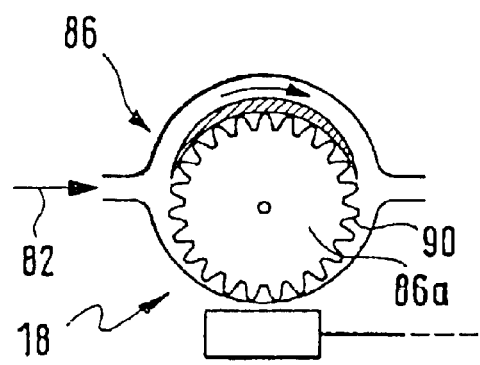
FIG. 9 is a view similar to FIG. 7 of a fourth embodiment of a through-flow measuring device.
Figure 9A:
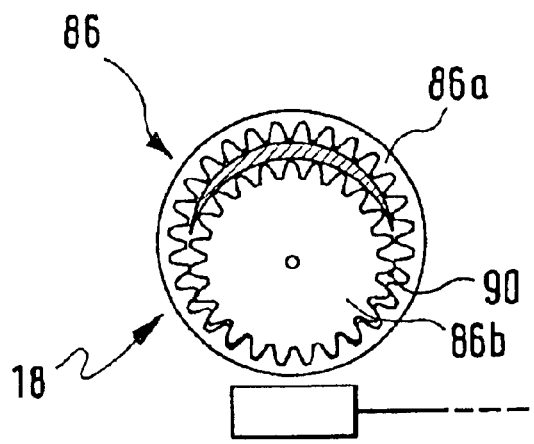
FIG. 9a is a view similar to FIG. 7 of a fifth embodiment of a through-flow measuring device.

In FIG. 8, another through-flow measuring device 18 is shown. This measuring device includes a toothed-wheel anemometer 86, which includes two mutually meshing toothed wheels 86a and 86b whose rotational speed is detected by an inductive sensor 88. A variation to this is shown in FIG. 9 and includes only one toothed wheel 86a having sickle-shaped teeth 90 at its outer periphery. A further variation is shown in FIG. 9a and likewise includes two toothed wheels, namely, an outer wheel 86a having an internal set of teeth and an inner toothed wheel 86b having an outer set of teeth. A sickle is disposed between the toothed wheels to prevent larger flow losses. The input and output run perpendicular to the plane of the drawing.

Figure 10:
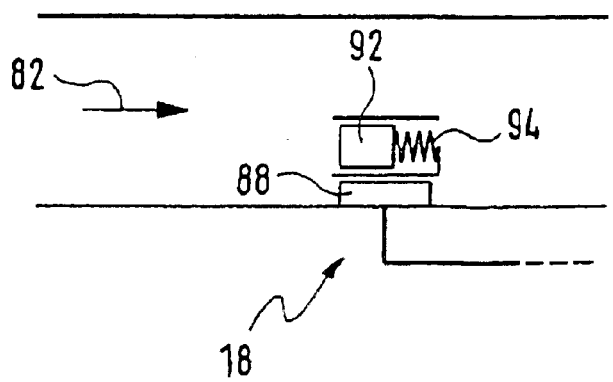
FIG. 10 is a view similar to FIG. 7 of a sixth embodiment of a through-flow measuring device; and, FIG. 11 is a view similar to FIG. 7 of a seventh embodiment of a through-flow measuring device.
Figure 11:
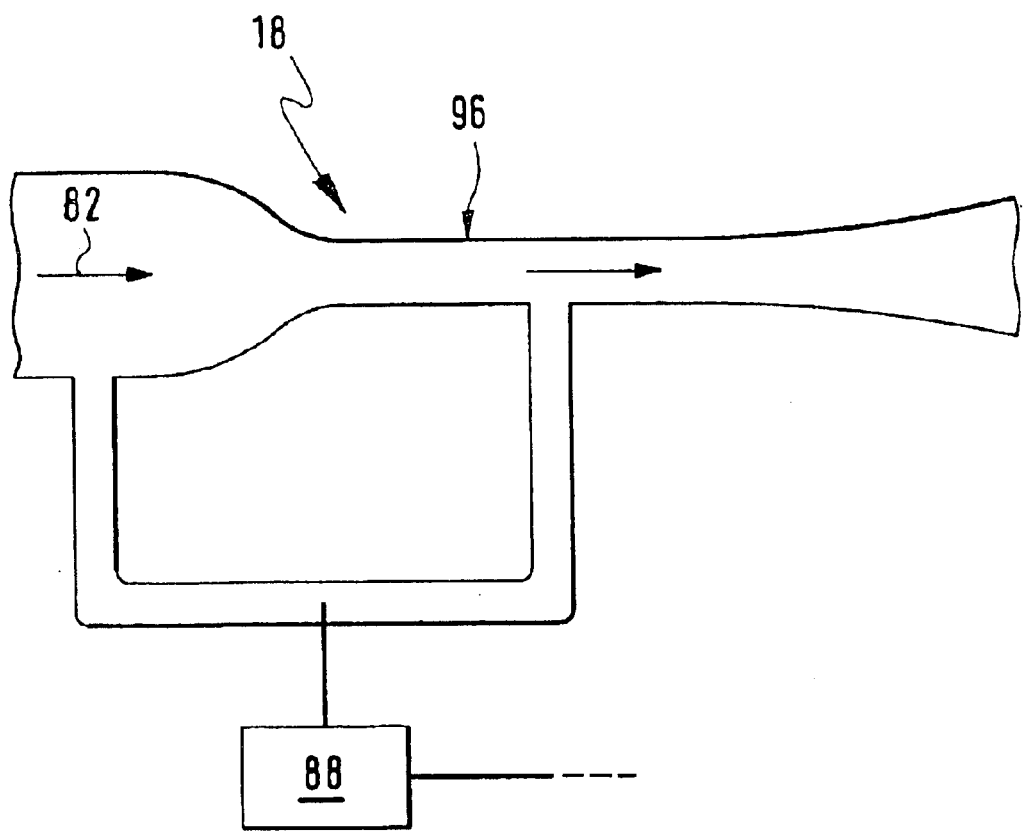

Another embodiment of a through-flow measuring device 18 is shown in FIG. 10 and includes a measuring piston 92 pretensioned by a pretensioning device 94 and charged by the fuel flow. The position of the measuring piston 92 is likewise tapped by an inductive sensor 88. The detection of the velocity V of the flow 82 is also possible by means of a venturi constriction 96 (FIG. 11). The pressure difference is detected by a pressure sensor 88.

It is understood that the foregoing description is that of the preferred embodiments of the invention and that various changes and modifications may be made thereto without departing from the spirit and scope of the invention as defined in the appended claims.

What is claimed is:

1. A method for operating an internal combustion engine having a number of combustion chambers wherein fuel is pumped by a fuel pump having an input connected to a fuel tank, the method comprising the steps of:
   providing a number of through-flow measuring devices for generating a signal, the number of the combustion chambers being greater than the number of the fuel flow measuring devices;
   providing a fuel-injection device for injecting fuel into said combustion chamber;
   determining the fuel quantity (m) which arrives in said combustion chamber from said signal; and
   assigning the fuel quantity (m) determined from said signal to a specific one of said combustion chambers with said fuel quantity (m) being assigned via the opening time point of said fuel-injection device and, if needed, via an angular position of a crankshaft of said engine.

2. The method of claim 1, wherein said through-flow measuring device measures the velocity (V) at which said fuel flows through a specific cross section (A) and said signal is representative of said velocity; and wherein the method comprises the further step of determining said fuel quantity (m) from said signal.

3. The method of claim 2, wherein said engine has a plurality of combustion chambers and a plurality of through-flow measuring devices assigned to corresponding ones of said cylinders; and wherein the method comprises the further step of determining the fuel quantity (m) for each of said combustion chambers from the signal of the through-flow measuring device corresponding thereto.

4. The method of claim 3, wherein the actual value of said fuel quantity (m) is controlled in accordance with a desired value.

5. The method of claim 1, the method comprising the further steps of:
   determining the time needed for the fuel to travel from the through-flow measuring device to the combustion chamber; and
   considering said time in the determination of said fuel quantity (m).

6. A The method of claim 3, the method comprising the further steps of:
   providing a lambda probe to supply a signal; and
   utilizing said signal of said lambda probe to determine the ratio of the fuel injected into one of the combustion chambers to the fuel combusted therein.

7. A method for operating an internal combustion engine having a combustion chamber wherein fuel is pumped by a fuel pump having an input connected to a fuel tank, the method comprising the steps of:
   providing a through-flow measuring device for generating a signal;
   providing a fuel-injection device for injecting fuel into said combustion chamber;
   determining the fuel quantity (m) which arrives in said combustion chamber from said signal;
   wherein said through-flow measuring device measures the velocity (V) at which said fuel flows through a specific cross section (A) and said signal is representative of said velocity; and wherein the method comprises the further step of determining said fuel quantity (m) from said signal; and
   wherein said engine has a greater number of said combustion chambers than of said through-flow measuring devices; and wherein the method comprises assigning the fuel quantity (m) determined from said signal to a specific one of said combustion chambers with said fuel quantity (m) being assigned via the opening time point of said fuel-injection device and, if needed, via an angular position of a crankshaft of said engine.

8. A method for operating an internal combustion engine having a combustion chamber wherein fuel is pumped by a fuel pump having an input connected to a fuel tank, the method comprising the steps of:
   providing a through-flow measuring device for generating a signal;
   providing a fuel-injection device for injecting fuel into said combustion chamber;
   determining the fuel quantity (m) which arrives in said combustion chamber from said signal;
   wherein said through-flow measuring device measure the velocity (V) at which said fuel flows through a specific cross section (A) and said signal is representative of said velocity; and wherein the method comprises the further step of determining said fuel quantity (m) from said signal;
   wherein said engine has a plurality of combustion chambers and a plurality of through-flow measuring devices assigned to corresponding ones of said cylinders; and
   wherein the method includes the further steps of:
   determining the fuel quantity (m) for each of said combustion chambers from the signal of the through-flow measuring device corresponding thereto;
   forming a mean value from the fuel quantities (m) determined for corresponding ones of said combustion chambers over at least a revolution of the crankshaft via sliding mean value formation;

forming standard deviations of said fuel quantities (m) reaching respective ones of said combustion chambers from said mean value; and changing the opening times of the individual fuel injection devices to make said standard deviations minimal.

9. The method of claim 8, wherein said can value is controlled in accordance with a desired value.

10. A computer program comprising a method which can be carried out when said computer program is run on a computer, the method being for operating an internal combustion engine having a combustion chamber wherein fuel is pumped by a fuel pump having an input connected to a fuel tank, the method comprising the steps of:

providing a through-flow measuring device for generating a signal, the number of the combustion chambers being greater than the number of the fuel flow measuring devices;

providing a fuel-injection device for injecting fuel into said combustion chamber;

determining the fuel quantity (m) which arrives in said combustion chamber from said signal; and assigning the fuel quantity (m) determined from said signal to a specific one of said combustion chambers with said fuel quantity (m) being assigned via the opening time point of said fuel-injection device and, if needed, via an angular position of a crankshaft of said engine.

11. The computer program of claim 10, wherein said computer program is stored on a memory including a flash memory or a ferrite RAM.

12. A control apparatus for operating an internal combustion engine, the control apparatus comprising:

a memory storing a computer program for carrying out a method for operating an internal combustion engine having a combustion chamber wherein fuel is pumped by a fuel pump having an input connected to a fuel tank, the method including the steps of:

providing a through-flow measuring device for generating a signal, the number of the combustion chambers being greater than the number of the fuel flow measuring devices;

providing a fuel-injection device for injecting fuel into said combustion chamber;

determining the fuel quantity (m) which arrives in said combustion chamber from said signal; and assigning the quantity (m) determined from said signal to a specific one of said combustion chambers with said fuel quantity (m) being assigned via the opening time point of said fuel-injection device and, if needed, via an angular position of a crankshaft of said engine.

13. An internal combustion engine having at least one combustion chamber, the engine comprising:

a fuel tank for fuel for said engine;

a fuel pump having an input end connected to said fuel tank;

a fuel-injection device through which a fuel quantity (m) reaches said combustion chamber;

a fuel feed line through which fuel is conducted to said fuel-injection device;

a number of through-flow measuring devices mounted in said fuel-feed line and said through-flow measuring device outputting a signal, the number of the combustion chambers being greater than the number of the fuel flow measuring devices;

means for determining said fuel quantity (m) from said signal; and means for assigning the fuel quantity (m) determined from said signal to a specific one of said combustion chambers with said fuel quantity (m) being assigned via the opening time point of said fuel-injection device and, if needed, via an angular position of a crankshaft of said engine.

14. The internal combustion engine of claim 13, wherein said engine includes a plurality of combustion chambers and a plurality of fuel-injection devices corresponding to respective ones of said combustion chambers and a plurality of said through-flow measuring devices assigned to corresponding ones of said fuel-injection devices.

15. The internal combustion engine of claim 14, wherein each one of said through-flow measuring devices is integrated into a corresponding one of said fuel-injection devices.

16. The internal combustion engine of claim 13, wherein said engine includes a plurality of combustion chambers and a plurality of fuel-injection devices corresponding to respective ones of said combustion chambers; and said through-flow measuring device is mounted in said common feed.

17. An internal combustion engine having at least one combustion chamber, the engine comprising:

a fuel tank for fuel for said engine;

a fuel pump having an input end connected to said fuel tank;

a fuel-injection device through which a fuel quantity (m) reaches said combustion chamber;

a fuel feed line through which fuel is conducted to said fuel-injection device;

at least one through-flow measuring device mounted in said fuel-feed line and said through-flow measuring device outputting a signal;

means for determining said fuel quantity (m) from said signal; and wherein said through-flow measuring device includes a hot-wire anemometer, a sensor having a bendable section mounted so as to be deflected by the flow of fuel; a resistance strain gauge for detecting the deflection of said bendable section; a displaceably mounted measuring piston charged by the flow of fuel; means for inductively sensing the displacement of said measuring piston; and, a venturi constriction or a toothed-wheel anemometer.

18. An internal combustion engine having at least one combustion chamber, the engine comprising:

a fuel tank for fuel for said engine;

a fuel pump having an input end connected to sad fuel tank;

a fuel-injection device through which a fuel quantity (m) reaches said combustion chamber;

a fuel feed line through which fuel is conducted to said fuel-injection device;

at least one through-flow measuring device mounted in said fuel-feed line and said through-flow measuring device outputting a signal;

means for determining said fuel quantity (m) from said signal;

a control apparatus including a memory storing a computer program for carrying out a method for operating an internal combustion engine having a combustion chamber wherein fuel is pumped by a fuel pump having an input connected to a fuel tank, the method including the steps of:

providing a through-flow measuring device for generating a signal;

providing a fuel-injection device for injecting fuel into said combustion chamber; and determining the fuel quantity (m) which arrives in said combustion chamber from said signal.

* * * * *

UNITED STATES PATENT AND TRADEMARK OFFICE
CERTIFICATE OF CORRECTION

PATENT NO. : 6,873,900 B2
DATED : March 29, 2005
INVENTOR(S) : Guernot Wuerfel and Rainer Ortmann It is certified that error appears in the above-identified patent and that said Letters Patent is hereby corrected as shown below:

Column 10,
Line 8, delete "A".
Line 50, delete "measure" and insert -- measures -- therefor.

Column 11,
Line 6, delete "can" and insert -- mean -- therefor.
Line 48, insert -- fuel -- before "quantity".

Column 12,
Line 51, delete "sad" and insert -- said -- therefor.

Signed and Sealed this

Twenty-fourth Day of May, 2005

JON W. DUDAS
*Director of the United States Patent and Trademark Office*